United States Patent [19]

Ishizawa

[11] Patent Number: 5,535,186
[45] Date of Patent: Jul. 9, 1996

[54] DISC RECORDING/REPRODUCING SYSTEM

[75] Inventor: Yoshiyuki Ishizawa, Kanagawa-ken, Japan

[73] Assignee: Kabushiki Kaisha Toshiba, Kawasaki, Japan

[21] Appl. No.: 233,878

[22] Filed: Apr. 26, 1994

[30] Foreign Application Priority Data

Apr. 28, 1993 [JP] Japan ..................... 5-102043

[51] Int. Cl.$^6$ .................................................. G11B 7/00
[52] U.S. Cl. ......................... 369/48; 369/124; 369/50
[58] Field of Search .................... 369/32, 50, 48, 369/54, 58, 124, 44.26; 360/51, 49, 77.08, 78.14

[56] References Cited

U.S. PATENT DOCUMENTS

| | | | |
|---|---|---|---|
| 4,819,218 | 4/1989 | Bernard | 369/50 |
| 5,384,671 | 1/1995 | Fisher | 360/77.08 |
| 5,412,629 | 5/1995 | Shirane | 369/50 |

FOREIGN PATENT DOCUMENTS

| | | |
|---|---|---|
| 0392853 | 4/1990 | European Pat. Off. . |
| 0461912 | 6/1991 | European Pat. Off. . |
| 0544017 | 6/1992 | European Pat. Off. . |

OTHER PUBLICATIONS

Patent Abstracts of Japan (JP-A-02 023 552 dated Jan. 25, 1990), vol. 14, No. 167 (P-1031), 30 Mar. 1990.
Patent Abstracts of Japan (JP-A-04 186 562 dated Jul. 3, 1992), vol. 16, No. 511 (P-1441), 21 Oct. 1992.
Patent Abstracts of Japan (JP-A-05 151 715 dated Jun. 18, 1993), vol. 17, No. 550 (P-1624), 4 Oct. 1993.
Patent Abstracts of Japan (JP-A-05 205 277 dated Aug. 13, 1993), vol. 17, No. 637 (P-1650), 25 Nov. 1993.

*Primary Examiner*—Nabil Z. Hindi
*Attorney, Agent, or Firm*—Cushman, Darby & Cushman

[57] ABSTRACT

A disc recording/reproducing system where recording/reproduced data rates change stepwise when spiral record tracks on a disc medium are divided in multiple zones in the radial direction and the disc is rotated and driven at a constant angular velocity or when a rotating and driving angular velocity changes stepwise for every zone, the disc recording/reproducing system is provided with a data rate control area provided at the boundary between a first and second zones on the disc medium for controlling the recording/reproduced data rate, a control area detecting device for detecting the data rate control area when continuously recording/reproducing data extends over the first and second zones and a frequency controller means for controlling the frequency of a recording/reproducing data extracting PLL or a recording reference frequency generating PLL when the data rate control area is detected.

5 Claims, 6 Drawing Sheets

DISC RECORDING/REPRODUCING SYSTEM

BACKGROUND OF THE INVENTION

1. Field of the Invention

The present invention generally relates to a disc recording/reproducing system, and more particularly, to a disc recording/reproducing system for formatting of a disc according to the MCAV (Modified Constant Angular Velocity) system or the MCLV (Modified Constant Linear Velocity) system.

2. Description of the Related Art

The CAV (Constant Angular Velocity) system has been largely used for formatting a writable optical disc because it provides easy rotating system control, etc. However, recording/reproducing of voluminous image data has been necessary in recent years, and the MCAV system, which has a larger capacity, has been increasingly adopted.

In the MCAV system, as illustrated in FIG. 1, the recording capacity of the entire disc is increased by dividing the recording surface of a disc 600 into several zones concentrically and providing a greater number of sectors per track at the outer zones of the disc than the inner zones. In FIG. 1, numeral 601 designates the n-th recording zone from the inside of the disc 600, and numeral 602 designates the (n+1)-th recording zone that is one zone outside the n-th recording zone.

As the disc rotation is regulated to be constant as in the CAV system, the control of the rotating system is easy. However, there is a problem in that the data processor becomes complicated as a recording/reproduced data rate differs for every zone on the disc.

The complication of a circuit at the recording side is not a serious problem, but the processing at the reproducing side becomes complicated, as it might become necessary to adjust the reproduced signal waveform equalization in consonance with data rate changes and a change-over of a frequency in a data extracting PLL. Furthermore, there is a problem in that a high level of high-frequency processing technology is necessary at the outer zones as the recording/reproduced data rate becomes high at the outer recording zones.

As a method for solving these problems, there is known a disc recording/reproducing system adopting the MCLV system. In this system, the format of a disc medium is the same as the CLV system, but the revolution speed for each zone is variable and the recording/reproduced data rate is kept constant. In order to change the disc revolution speed, the rotating control becomes somewhat complicated, but as the disc revolution speed has been fixed for each zone, the control of the rotating system is relatively easy as compared with the CLV system, which requires controlling the rotation system while extracting at a data rate.

Recently, a writable optical disc is available to store program data and graphics data used by computers, etc. Therefore, it is important for such a disc to be able to record/reproduce data at high speed with high reliability.

However, pursuant to the advance of image/audio compression technology in recent years, a required data storage capacity has been reduced, and it has become possible to realize a digital video disc that is capable of recording/reproducing motion pictures and audio data as digital data on an optical disc.

When considering such uses as described above, not only is high speed recording/reproduction required but also a real time property for constant recording/reproduction of required data is important.

The MCLV system has merits as a system in which the data processing and rotating system control are relatively easy so that it is possible to achieve a large storage capacity. However, the MCLV system has a problem when used to record/reproduce motion picture data, etc. That is, there is no problem in recording/reproduction within one zone, but when recording/reproducing data continuously extending over multiple zones, there is a problem in that a data rate abruptly changes because a disc rotation cannot be changed quickly in correspondence with transitions between record zones.

FIG. 2 is a time chart showing a relationship between the disc revolution speed and data rates in the MCLV system. The disc revolution speed represented by waveform 700 cannot drop quickly, but it drops gently when the tracking operation of zones moves from the n-th record zone 601 to the (n+1)-th record zone 602. On the other hand, a reproduced data rate 701 becomes high temporarily when the tracking of record zones moves from the n-th record zone to the (n+1)-th record zone. Therefore, the data extracting PLL at the reproducing side cannot follow the quick change of the data rate. Also, the reproduction processing cannot be performed until the data rate frequency enters into the PLL pull-in range. So, there is a problem in that the reproduction processing is suspended until the disc rotation is stabilized. As a result, data cannot be reproduced constantly.

There is a method to compensate data that are omitted during the suspension period by storing reproduced data proportional to the suspension of the processing in a buffer memory in advance before a tracking operation moves to another record zone. However, this method requires a memory having a voluminous capacity for storing data for several tracks as it becomes necessary to make a retracing to the first sector of a zone after the disc rotation is stabilized. Furthermore, the complicated recording/reproduction processing is inevitable.

As described above, in the conventional MCLV system, there is a problem in that a sufficient measure could not be taken for a real time property required for realizing digital video disc, etc., in the data processing when the tracking of record zones moves from zone to zone.

As described above, according to the conventional MCLV system, there is a problem in that when data are continuously recorded/reproduced extending over the data record zones, a data rate changes abruptly and the data extracting PLL cannot follow the abrupt change of data rates and the reproduction processing has to be suspended temporarily until the disc rotation is stabilized and thus, the real time property is impaired.

SUMMARY OF THE INVENTION

It is, therefore, an object of the present invention to provide a disc recording/reproducing system which makes it possible to reproduce data continuously without suspending the data processing even in the MCLV system by eliminating the defects described above.

In order to achieve the object described above, in a disc recording/reproducing system of the present invention, spiral recording tracks on a spiral recording medium are divided into several zones in the radial direction and a recording/reproduced data rate changes stepwise for every transition of the tracking operation from zone to zone as the disc rotates at a constant angular velocity or a recording/ reproduced data rate becomes constant when a rotating and driving angular velocity changes stepwise for each zone, a data rate control area for controlling the recording/reproduced data rate is provided on the boundary between the first and second zones on the disc medium, and there is provided a means for detecting the data rate control area when recording/reproducing data extends continuously over the first and second zones, and a means for controlling a frequency of a recording/reproducing data extraction PLL or a recording reference frequency generating PLL when the data rate control area is detected.

In the system having a construction as described above, when a recording/reproducing head, which traces a disc medium, passes through the data rate control area provided on the boundary of the record zones, the frequency of the data extraction PLL is controlled when reproducing the data or the frequency of the recording reference frequency generating PLL are controlled when recording the data. Thus, respective PLLs can follow the abrupt change of data rates, preventing the suspension of data processing for a long time that is generated when the recording/reproducing data extends continuously over the record zones.

Additional objects and advantages of the present invention will be apparent to persons skilled in the art from the study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
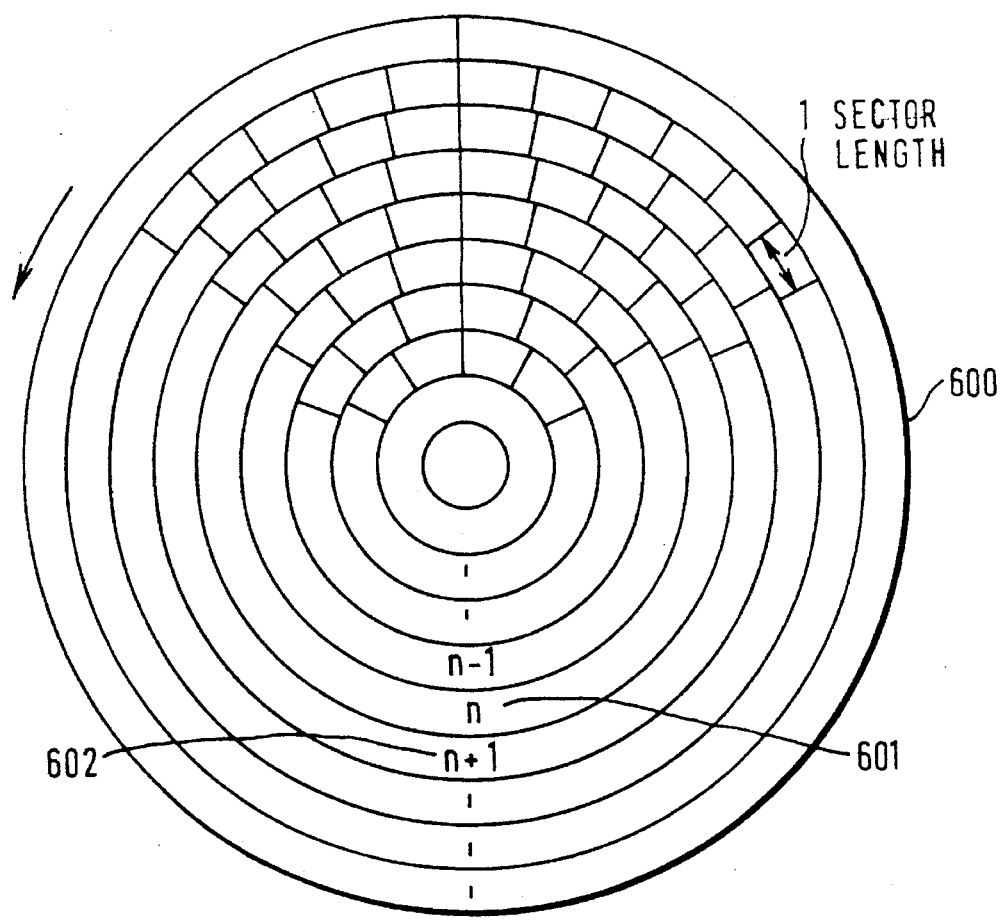
FIG. 1 is an explanatory drawing of a disc recording format in a conventional MCLV system.

The present invention is described in detail below with reference to the FIGS. 3 through 7. Throughout the drawings, like or equivalent reference numerals or letters will be used to designate like or equivalent elements for simplicity of explanation.

Figure 3:
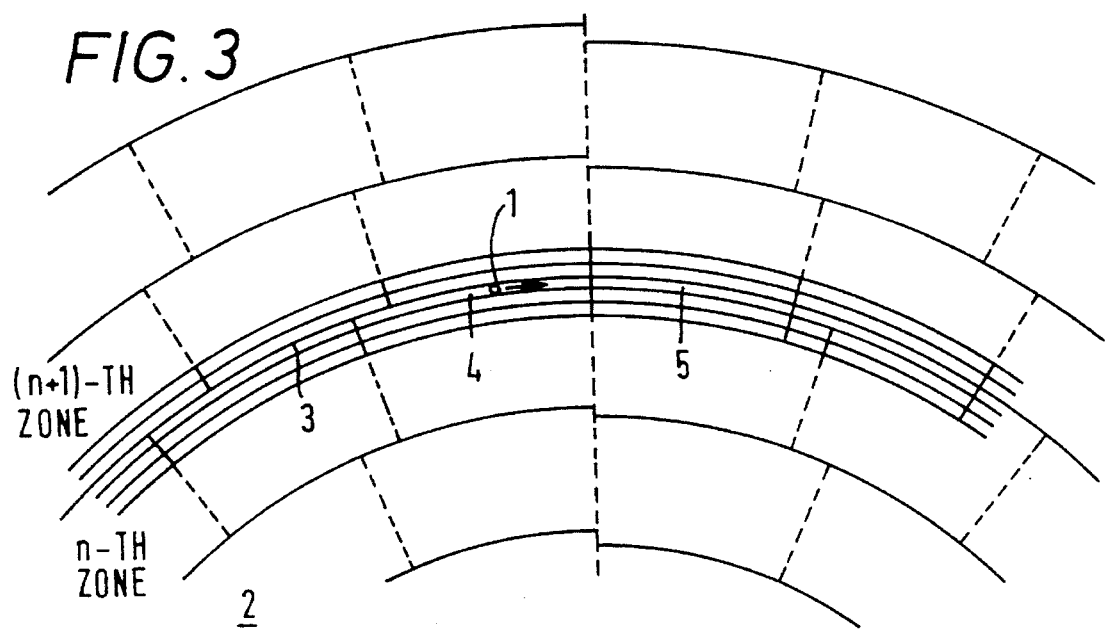
FIG. 3 is an explanatory diagram of a recording format of a disc according to one embodiment of the present invention.
Figure 2:
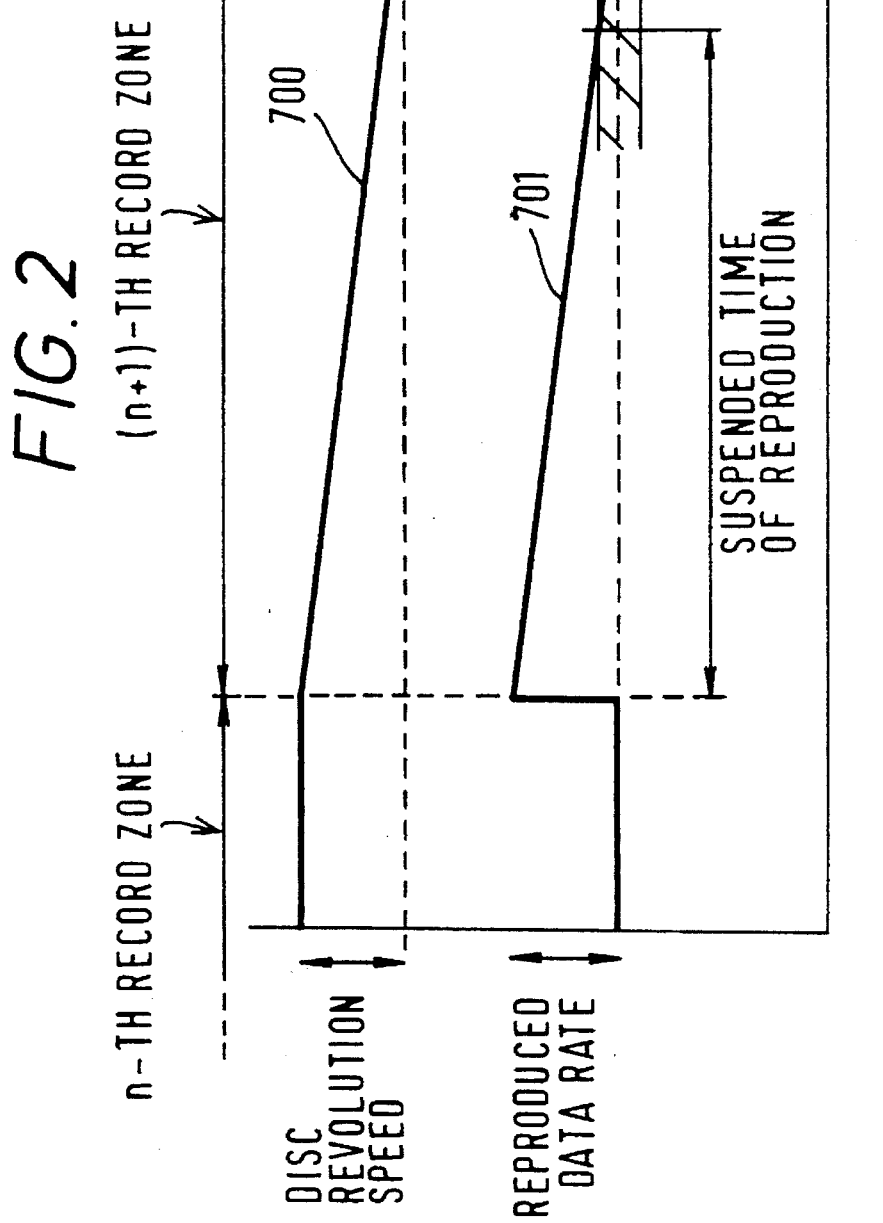
FIG. 2 is a diagram showing the relationship between the rotation speed of a disc and the data rate in a conventional MCLV system.
Figure 4A:
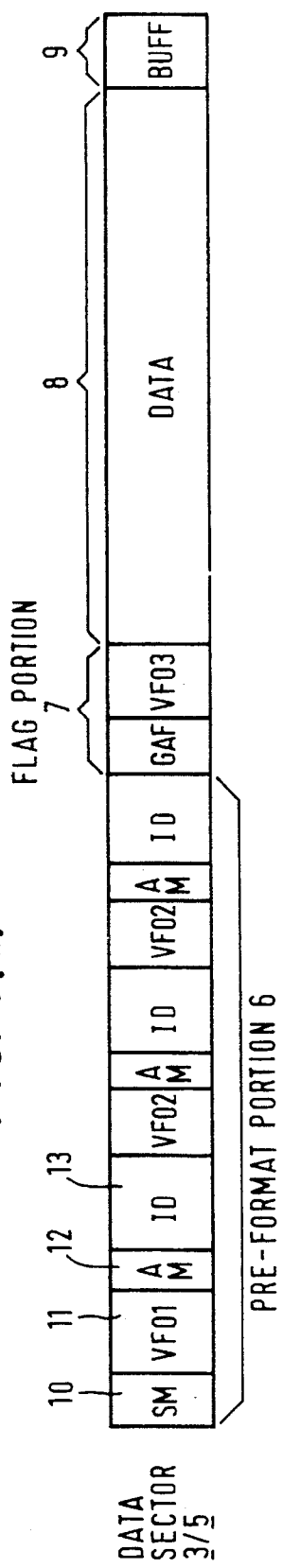
FIGS. 4(a)–4(c) are diagrams illustrating formats of data sectors 3 and 5, a rate control sector 4 and an ID data in the sectors in the embodiment shown in FIG. 3.
Figure 4B:
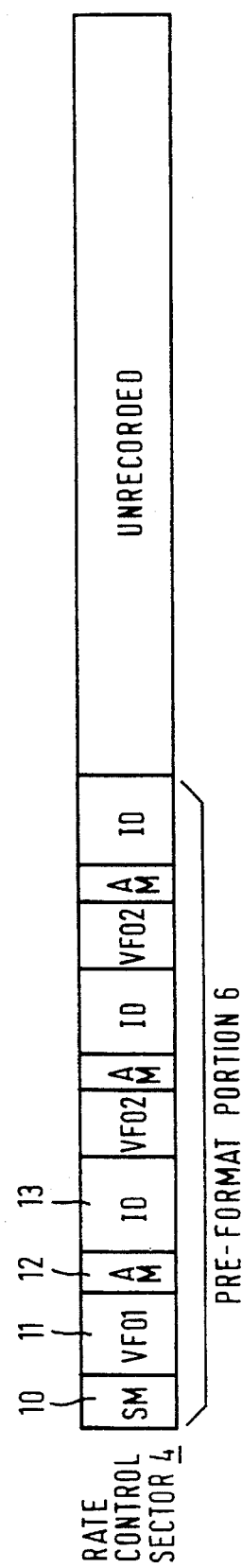
Figure 4C:
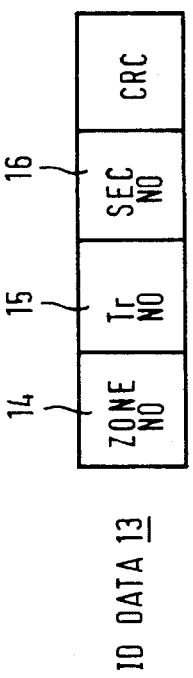

Referring now to FIGS. 3 and 4(a)–(c), a first embodiment of the disc recording/reproducing system according to the present invention will be described in detail. FIG. 3 is an explanatory drawing of a recording format of discs according to the first embodiment of the present invention.

A small circle 1 represents a light beam spot applied from an optical head (not shown) to the data carrying surface of a disc 2. The data carrying surface of the disc 2 is divided into concentric record zone, and each record zone is divided into sectors.

The light spot 1 traces, for instance, the last data sector 3 of the record zone No. 4, the data rate control sector 4 which is the data rate control area for the zone No. 4 and the first data sector 5 of the zone No. 5, in the order.

FIG. 4 is an explanatory drawing showing the data formats of the data sectors 3 and 5 and the rate control sector 4. The data sectors 3 and 5 are each composed of a preformat portion 6, a flag portion 7, a data portion 8 and a buffer portion 9. The preformat portion 6 is also composed of a sector mark 10, a PLL pull-in signal data 11, an address mark 12 and an ID data 13. The data control sector 4 is actually formatted in the same manner as other sectors for a data recording/reproduction. The rate control sector 4 is composed of the preformat portion 6 and others, and the preformat portion 6 is composed of the sector mark 10, the PLL pull-in signal data 11 and the address mark 12 and the ID data 13.

Here, the ID data 13 of the preformat portion 6 is used for distinguishing a normal data sector or a rate control sector. In the case of the rate control sector 4, the zone No. 14 and the sector No. 16 are incremented according to respective positions of the zone and the sector like other data sectors. However, the tract No. 15, for instance, takes a fixed value not containing any "0" data, while other sectors are incremented from the inner sectors towards the outer sectors.

Thus, the format can be easily identified only by the track No. 15. Futher, as absolute positions of the sectors have been fixed, if the last data sector 3 of each zone has been recognized, it is easy to determine that the next sector is the rate control sector 4.

Figure 5:
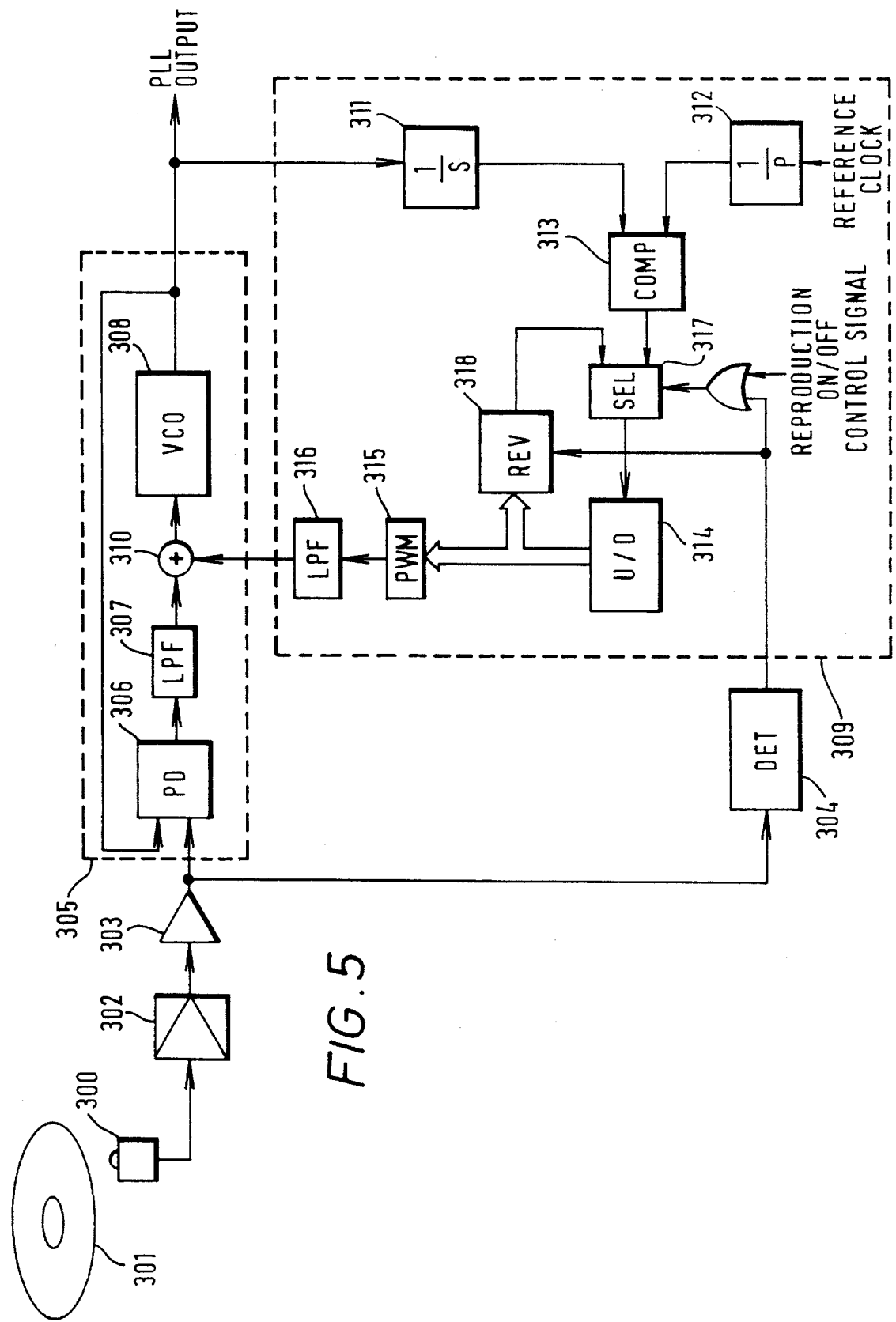
FIG. 5 is a block diagram showing a reproduction portion of the MCLV system according to a first embodiment shown in FIG. 3.

FIG. 5 is a block digram showing a reproduction side data clock extracting section of the MCLV system according to one embodiment of the present invention. A signal read from an optical disc 301 by an optical head 300 is input to a data slicer 303 through a reproducing amplifier 302. The reproduced data is shaped by the data slicer 303 so as to be restored to its original binary data, and then input to a rate control sector detector 304 and a PLL 305. In the rate control sector detector 304, a rate control sector is detected by detecting the ID data 13 in the preformat portion 6. The PLL 305 is composed of standard elements, such as a phase comparator 306, an LPF 307, an adder 310 and a VCO 308, in addition to a frequency controller 309 for supplying a frequency control voltage to the adder 310.

The frequency controller 309 controls the output frequency of a 1/S frequency divider 311, which divides the output frequency of the VCO 308 by S, so as the 1/S divided frequency is made equal to the output frequency of a 1/P frequency divider 312 which divides a reference clock (i.e., a data rate frequency). These frequencies from the 1/S frequency divider 311 and the 1/P frequency divider 312 are compared with each other by a frequency comparator 313. Then the count value of an up/down counter 314 is incremented or decremented according to the result of the comparison in the comparator 313. The count value of the up/down counter 314 is modified into a pulse width modulation (PWM) signal. The PWM signal is then supplied to the VCO 308 as a voltage signal through an LPF 316 and the adder 310.

However, the frequency control is carried out only when the optical disc 301 is kept in the stopped state or when the data rate control sector detector 304 has detected a data rate control sector. When the optical disc 301 is kept in the stopped state, the outputs of the 1/S frequency divider 311 and the 1/P frequency divider 312 are selected to the same divided frequent so as that the oscillation frequency of the VCO 308 is controlled to approach the data rate frequency of a reference clock.

In the ordinary reproducing operation, a selector 317 selects a status restoring circuit 318. Therefore, the control loop enters the closed state in which a fixed voltage is input to the adder 310.

Figure 6:
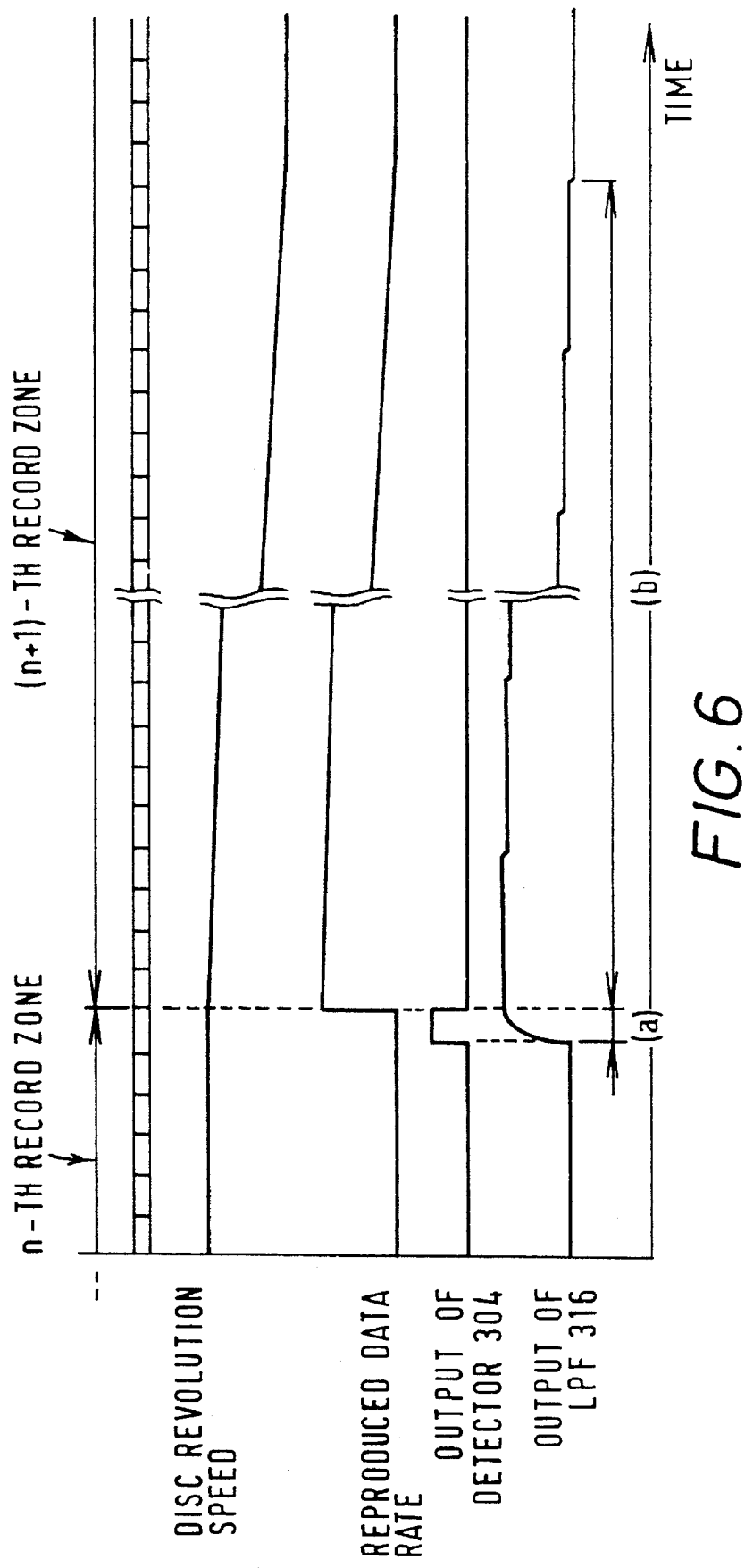
FIG. 6 is a time chart for explaining the operating state of a data clock extracting section in the embodiment shown in FIG. 3.

FIG. 6 is a time chart for explaining the operation of the data clock extracting section when the optical head 300 traces the record tracks from the zone No. 4 to the zone No. 5 in this embodiment. When the rate control sector detector 304 detects a rate control sector, the selector 317 selects the frequency comparator 313 so as to form a frequency control loop (FIG. 6(a)).

At this time, the value S of the 1/S frequency divider 311 takes a value the same as the number of sectors in the zone No. 5, while the value P of the 1/P frequency divider 312 takes a value the same as the number of sectors in the zone No. 4. As a result, the oscillation frequency of the VCO 308 increases so that the oscillation frequency of the PLL 305 approaches a reproduced data rate when the zone No. 5 is reproduced at the same disc revolution speed as the zone No. 4.

After completing the frequency loop control, the status restoring operation starts. The status restoring circuit 318 restores the output value of the U/D counter 314 that was incremented or decremented in a loop control range (a) (see FIG. 6) to the output value of the U/D counter 314 obtained through the frequency adjustment operation during the state that optical disc 301 is kept in the stopped state. In this case, the output value is not restored at a stroke, but is restored in consonance with the change of the rotation of the optical disc 301, gradually for a long range (b) as illustrated in FIG. 6.

In this embodiment, as the oscillation frequency is forcibly changed in consonance with the change of the data rate, it becomes possible for the PLL 305 to surely read data from the first sector of a succeeding zone to which the reading operation has forwarded.

Figure 7:
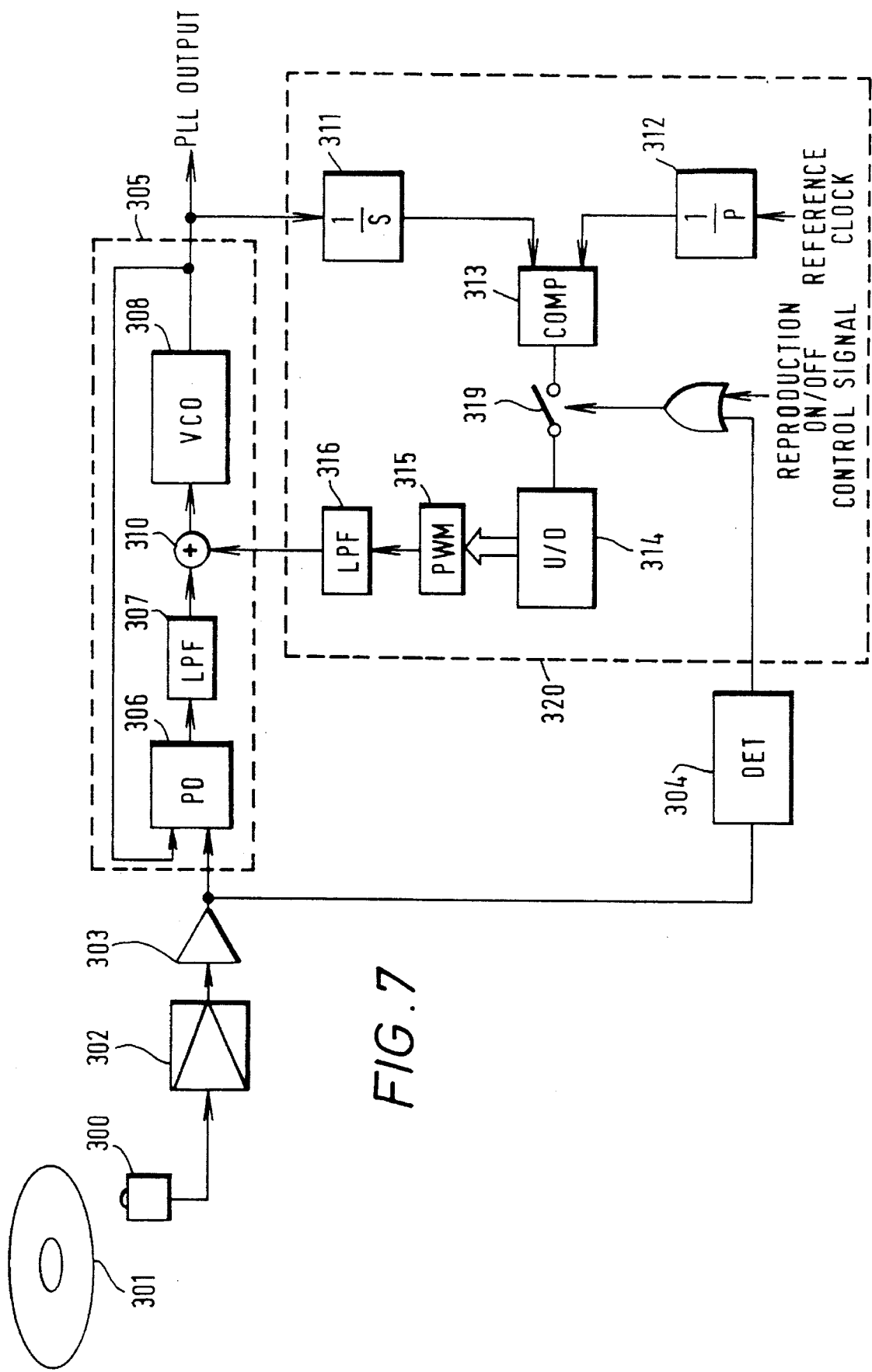
FIG. 7 is a block diagram showing a reproduction portion of a data clock extracting section of the MCAV system according to a second embodiment of the present invention.

FIG. 7 is a block diagram showing a second embodiment of the reproduction side data extracting section of the MCAV system according to the present invention. In FIG. 7, reference numerals used in the first embodiment, as shown in FIG. 5, will be used to designate the equivalent elements.

A signal read from an optical disc 301 output by an optical head 300 is input to a data slicer 303 through a reproducing amplifier 302. The reproduced data is shaped in the data slicer 303 so as to be restored its original binary data, and then input to a rate control sector detector 304 and a PLL 305. In the rate control sector detector 304, a rate control sector is detected by detecting the ID data 13 in the preformat portion 6 (see FIG. 4). The PLL 305 is composed of standard elements, such as a phase comparator 306, an LPF 307, an adder 310 and a VCO 308 in addition to a frequency controller 309 for supplying a frequency control voltage to the adder 310.

The frequency controller 320 controls the output frequency of a 1/S frequency divider 311 which divides the output frequency of the VCO 308 by S so as to the 1/S divided frequency is made equal to the output frequency of a 1/P frequency divider 312 which divides a reference clock (i.e. a data rate frequency). These frequencies from the 1/S frequency divider 311 and the 1/P frequency divider 312 are compared with each other by a frequency comparator 313. Then the count value of an up/down counter 314 is incremented or decremented according to the result of the comparison in the comparator 313. The count value of the up/down counter 314 is modified into a pulse width modulation (PWM) signal. The PWM signal is then supplied to the VCO 308 through an LPF 316 and the adder 310.

However, the frequency control is carried out only when the optical disc 301 is kept in the stopped state or when the rate control sector detector 304 has detected a rate control sector. When the optical disc 301 is kept in the stopped state, the outputs of the 1/S frequency divider 311 and the 1/P frequency divider 312 are selected to the same divided frequency so as that the oscillation frequency of the VCO 308 is controlled to approach the data rate frequency of a reference clock.

Although in the MCAV system the rotation speed of the disc 301 does not change, it is necessary to make the PLL 305 follow a data rate which changes for every transition of the tracking from zone to zone. Therefore, the frequency loop is controlled when the rate control sector detector 304 detects a rate control sector.

In the second embodiment, as the frequency loop is controlled whenever a rate control sector is detected by the rate control sector detector 304 and the PLL follows a data rate which changes for every transition of tracking from zone to zone on the record carrying surface of the disc 301, it becomes possible to positively extract the reference clock in the MCLV system.

Further, the first and second embodiments as described above are applied to the reproduction side, but they are also applicable to a recording side. At a recording side, it is not necessary to extract a reference clock. However, in the MCAV system, it is necessary, for instance, to change a recording data rate for every zone. When the rate control sector detector 304 detects a rate control sector, it is possible to control the operating frequency of the recording reference frequency generating PLL which decides a recording data rate.

As described above, the present invention can provide an extremely preferable disc recording/reproducing system. That is, according to the present invention, even when data are continuously recorded/reproduced extending over some number of record zones, the data extraction PLL operation in the reproducing operation and the frequency in the recording reference frequency generating PLL operation in the recording operation are able to follow even the abrupt change of the data rate by controlling the frequency in each PLL operation, when the recording/reproducing head traces the data rate control area provided on the boundary between the record zones. Therefore, it is not necessary to suspend the recording/reproducing processing for a long hour. Thus, when only a relatively small buffer memory is provided, a continuous data recording/reproduction becomes possible and the recording/reproduction of such data as motion picture, etc. in which a real time property is regarded important can be achieved.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A disc recording/reproducing system wherein record tracks on a disc are divided in multiple zones in a radial direction of the disc and wherein the disc is rotated and driven at a constant angular velocity so that a recording/reproducing data rate changes stepwise for every zone on the disc or rotated and driven such that an angular velocity changes stepwise for every zone on the disc, the disc recording/reproducing system comprising:

a data rate control area provided at a boundary between a first zone and a second zone on said disc or controlling said recording/reproduced data rate;

a control area detecting means for detecting said data rate control area when data extends between said first and said second zones; and a frequency control means for controlling a frequency of one of a recording/reproducing data extracting PLL and a recording reference frequency generating PLL when said data rate control area is detected, wherein said frequency control means comprises:

a reference clock;

a comparator that compares an output of said data extracting PLL and an output of said reference clock;

an up/down counter which is incremented or decremented based on an output of said comparator thereby outputting a count value; and means for modifying said count value into a pulse width modulated signal and providing said pulse width modulated signal as an input to said data extracting PLL to control a frequency of said output of said data extracting PLL.

2. A disc recording/reproducing system according to claim 1, further comprising means for controlling said frequency control means so that said frequency control means is actuated if said control area detecting means detects said data rate control area.

3. A disc recording/reproducing system according to claim 2, wherein said frequency control means is also actuated if said disc is in a stopped state.

4. A disc recording/reproducing system according to claim 2, wherein said means for controlling includes a selector for selectively providing said comparison output to said up/down counter responsive to an output of said control area detecting means.

5. A disc recording/reproducing system according to claim 1, wherein said data extracting PLL comprises:

a phase detector receiving a signal reproduced from reading said disc;

an added receiving an output of said phase detector and an output of said frequency control means; and a voltage controlled oscillator receiving an output of said adder and producing a signal having a frequency based on said output of said adder.

\* \* \* \* \*